United States Patent Office 3,205,149
Patented Sept. 7, 1965

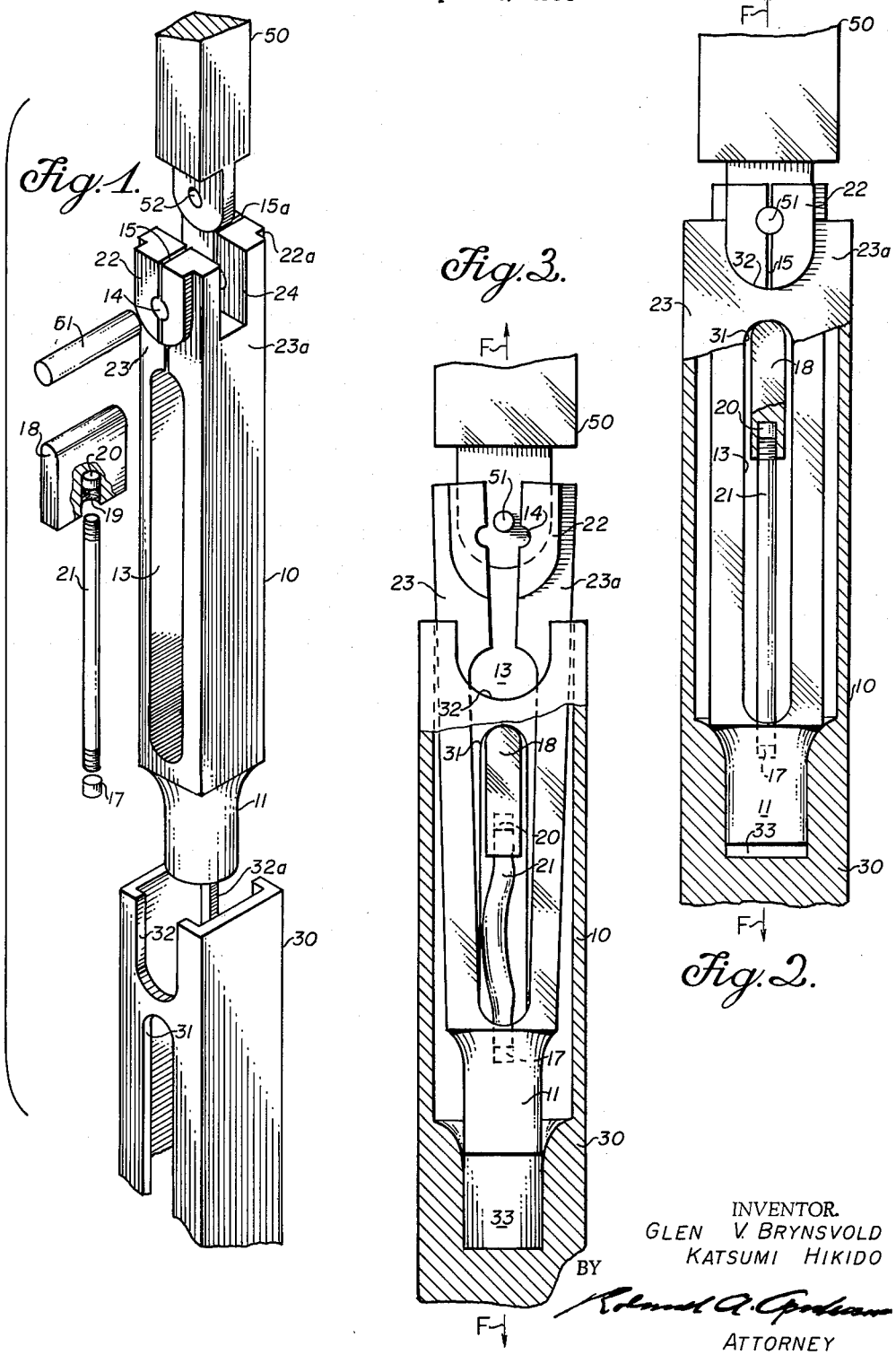

3,205,149
FUSE DEVICE FOR A NUCLEAR REACTOR
Glen V. Brynsvold, San Jose, and Katsumi Hikido, Campbell, Calif., assignors to the United States of America as represented by the United States Atomic Energy Commission
Filed Apr. 6, 1964, Ser. No. 357,843
7 Claims. (Cl. 176—87)

This invention relates to nuclear reactors and in particular to safety devices for automatically shutting down the reactor upon a dangerous increase in neutron flux and the attendant increase of the reactivity level in such a reactor.

Many of the fuse devices currently developed require the complete melting of a fusible link which is connected to either a reactor poisoning system, i.e., a system for absorbing neutrons, or a system for decreasing reactivity as by decreasing the mass of fissionable material in the core below critical mass.

The fusible link generally employed in prior art devices is either a low melting point alloy or preferably metallic uranium highly enriched in its isotope of either U–235 or U–233 or both. Metallic U–235 or one of its alloys is preferred because it almost instantaneously responds by a rapid increase in temperature to changes in the neutron flux due to release of fission energy within the material. Low melting point alloy fuses which are not responsive to changes in neutron flux must rely on the various time dependent heat transfer processes of conduction, convection or thermal radiation from the surrounding fuel material to supply the heat for producing the necessary temperature rise in the mass of the fuse link material.

The present invention utilizes a deformable pin means fabricated of uranium which is highly enriched in U–235 or U–233 which deformable pin means is prestressed in such manner that a temperature rise sufficient to cause complete melting of material is not required in order to actuate a reactivity decrease system. In other words the fuel pin is arranged to operate in the plastic flow deformation temperature range below the melting point of the pin material. Because melting is not required, the added heat to satisfy the heat of fusion requirement to melt uranium is not needed. Thus, because less heat is required the operating time for the fuse device embodied in this invention is shorter than the operating time for prior art devices. The rate of rise in temperature of the fuse pin utilized in this invention is dependent only upon the mass of the pin, its specific heat and its rate of heat loss by conduction and thermal radiation. Because operating time is shorter and because melting temperature of the pin is not reached, a relatively rapid increase in reactivity can be quelled before a dangerous melting condition within the reactor core can be reached. Therefore, operating safety of a nuclear reactor incorporating this invention is greatly enhanced.

It is, therefore, an object of this invention to provide a device which will increase the operating safety of a nuclear reactor.

It is a further object of this invention to provide a device to actuate means for reducing reactivity in a nuclear reactor upon reaching a dangerously high level of reactivity.

It is a further object of this invention to provide a device which is responsive to neutron flux and which will cause a nuclear reactor to shut down upon reaching a dangerous neutron flux.

It is a further object of this invention to provide a device which will reduce the reactivity of a nuclear reactor rapidly in response to a relatively rapid increase in reactor core temperature before serious damage to the core occurs.

It is a further object of this invention to provide a device which will actuate means for reducing reactivity in a nuclear reactor utilizing a prestressed fuse pin in the fuse link body and is actuated as the pin reaches a temperature at which plastic deformation of uranium or U–235 or U–233 containing material can occur.

These and other objects of this invention will become apparent from the following description taken in accordance with the accompanying drawings in which FIGURE 1 is an exploded perspective view of the fuse device;

FIGURE 2 is a simplified longitudinal section of the fuse device before actuation; and, FIGURE 3 is a simplified longitudinal section of the fuse device after actuation.

It should be understood that this invention is basically a triggering device and that various means for reducing reactivity within a nuclear reactor may be coupled to and actuated thereby. The particular embodiment herein described, is a device arranged to decrease reactivity by removing fissile material contained as in a fuel element from the core upon creation of a dangerous excessive reactivity condition with the core. Similar arrangements may be provided, however, for inserting a poison or the like to reduce reactivity.

Referring to FIGURE 1, the basic elements of the device of the invention comprise an elongated box-like fuse link body 10 bifurcated at the upper end and arranged to nest or fit inside a lower box-like coupling piece 30 in a telescoping relation so that the upper end of said fuse body 10 is exposed in order to receive and be connected to an upper tongued coupling piece 50 by means of a dowel connecting pin 51. The upper coupling piece 50 is normally secured to a fuel element support structure and the lower coupling piece 30 is incorporated in, or connected to a fuel element (not shown), which will be caused to separate downwardly or be expelled from the reactor core when coupling pieces 50 and 30 are actuated as described hereinafter. The removal of the fissile material from the neutron flux region of the core of course causes a correlative reduction in the reactivity coefficient of the reactor core.

More particularly, the upper end of fuse body 10 is of a shape analogous to a tuning fork each of whose tines 23, 23a is divided by bifurcation slots 15, 15a. Opposing sides of central portions of body 10 are provided with a longitudinal slot in mutually matching relation, and the lower end of body 10 is formed into a lower cylindrical guide 11 adapted to slide into a recess 33 provided in the lower interior of the upper end of body 30. Longitudinal slot 13, passing through fuse link 10, has, at its lower end, a partially drilled hole or socket 16 whose cylindrical axis is preferably coincident with the longitudinal centerline of fuse body 10. The upper end of slot 13 is arranged to receive and act as a guide for fuse pin support bar 18 in whose edge facing the lower end of slot 13 is a partially drilled hole or socket 19. The cylindrical axis of partially drilled hole 19 is also arranged to be coincident with the longitudinal centerline of fuse link 10 when fuse pin support bar 18 is transversely centered in said longitudinal slot 13. Upper insulator pellet 20 and lower insulator pellet 17 are arranged to seat, respectively, in said sockets 19 and 16.

A fuse pin 21 is disposed with the ends in said sockets so as to be situated between said insulator pellets with the longitudinal centerline, of course, also coincident with the longitudinal centerline of fuse body 10 which pin 21 is used to trigger operation of the device. At its upper end, fuse body 10 has guides 22 and 22a, each of said guides split down its center by bifurcation slots 15 and 15a and each of said guides located on opposite outside edges of tines 23 and 23a. Said upper guides 22 and 22a are arranged to fit into corresponding mating slots 32 and 32a in the upper portion of lower coupling piece 30 so that the sides of slots 32 and 32a prevent tines 23 and 23a from being spread apart. Hole 14, of a diameter providing a tight fit to receive dowel connecting pin 51, is provided in the upper portion of fuse link 10 passing through and normal to upper guides 22 and 22a and longitudinally bisected by bifurcation slots 15 and 15a. The distance between the outside surface of tine 23 and the outside surface of tine 23a is arranged to be less than the corresponding inside diameter of lower coupling piece 30 by an amount at least equal to the diameter of dowel connecting pin 51. Slot 24, transverse to the plane of bifurcation slots 15 and 15a is provided in the upper portion of fuse link 10 to receive the lower end of upper coupling piece 50 and permit a small amount of rotational movement of upper coupling piece 50 about the axis of dowel connecting pin 51.

In its assembled position, fuse body 10 fits inside lower coupling piece 30 with lower guide 11 arranged to nest in the mating recess 33 in the lower interior portion of lower coupling piece 30. Slot 31 in lower coupling piece 30 is aligned with slot 13 in fuse link 10 so that fuse pin support bar 18 passes through both slots 13 and 31 with the ends of fuse pin support bar 18 even with the outside surfaces of lower coupling piece 30. Fuse pin 21 is arranged to be of such a length that when assembled, fuse pin support bar 18 will be forced against the upper end of slot 31 so that the frictional fit will prevent said support bar 18 from sliding out of slots 13 and 31. Of course, in lieu of making fuse pin 21 a specified length, spacers added to the fuse pin support bar 18, end plates or other means could be used to achieve the same result of holding fuse pin support bar 18 in place and compressing pin 21 without departing from the operation of the invention as a whole.

Operation of the device of the invention is illustrated in FIGURES 2 and 3 showing, respectively, the before and after actuation configuration of the device.

Referring to FIGURE 2, upper coupling piece 50 and lower coupling piece 30 are maintained in tension by means of equal and opposite forces F acting upward on upper coupling piece 50 and downward on lower coupling piece 30 produced by disposition of the fuse device of the invention as a coupling element between a fuel element support and a fuel element disposed in a fuel channel of the reactor core. Such force may accordingly be created by any convenient means, such as, by the weight of the fuel element suspended therefrom and acting under the pull of gravity, helical springs arranged to provide such a force tending to extend the telescoped members or the like. The force must be sufficient, however, to create a compressive stress in fuse pin 21 sufficient to permit the plastic flow yield point of the pin to be reached upon a rise in pin temperature yet not be so high as to exceed the yield point of the pin at the operating temperature of the reactor in the situs of the fuse element nor be of such a magitude that the pin will slowly decrease in length due to creep phenomena, thus prematuely tripping the fuse.

The fuse pin 21 is, of course, necessarily located in the neutron flux region of the reactor core at a location where the increase of neutron flux can be effectively sensed. However, such fuel pin must also be located at a location or position in the fuel channel such that the normal operating neutron flux level does not cause heating of the fuel pin to a level at which plastic flow deformation of the pin occurs. The important factor to be considered is the disposition of the fuse pin 21 in the neutron flux region of the core at a location at which the heating of the fuel pin approaches but does not exceed the lower temperature limit of the compressive plastic flow region. Heat regulation means such as cooling means effective to regulate and maintain the fuel pin at the desired normal operating temperature could also be used. The cooling means should be one which in effect removes the heat through a heat flow resistance path so that a normal equilibrium operating pin temperature is achieved with normal reactivity levels but which resistance is of sufficient magnitude to restrain the loss of heating produced by excess reactivity increases. It has been found that a compressive stress of approximately 15,000 p.s.i. in the fuse pin will produce satisfactory results. The fuse pin in this case was fabricated from 90% U-235 enriched metallic uranium. If an alloy of U-235 is used or a pin fabricated of other fissile material such as those normally employed in fuel elements, the above compressive stress would be adjusted similarly to conform to the particular mechanical compressive stress characteristics of the specific alloy or other material as may be determined from published data or by simple experimentation.

Fuse pin 21 is caused to be in compression as a result of downward force F acting on the lower coupling piece 30 transmitting said downward force in series, through lower coupling piece 30, and the upper shoulder of slot 31 to fuse pin support bar 18, through fuse pin support bar 18 and insulator pellet 20 to the top of fuse pin 21 and, by upward force F acting on upper coupling piece 50 transmitting said upward force, in series, through upper coupling piece 50, dowel connecting pin 51, fuse link 10, lower insulator pellet 17 to the bottom of fuse pin 21.

Before the fuse element is actuated, dowel connecting pin 51 is held in position by virtue of the clamping action of tines 23 and 23a against the pin. The clamping action is maintained by slot 32, in lower coupling piece 30, holding each half of upper guides 23 and 23a together.

When the fuse element is exposed to a predetermined dangerously high neutron flux, fuse pin 21, previously described as being fabricated from uranium highly enriched in U-235 or the like, will increase in temeprature due to fission energy released within the pin. Since the yield strength of metallic uranium decreases rapidly with increase in temperature when arranged as described above, a temperature, below the melting point of uranium, will be reached at which the yield strength is equal to or exceeded by the compressive stress F on fuse pin 21 thus causing the pin to collapse. As fuse pin 21 collapses, fuse link 10 will rise relative to lower coupling piece 30 due to upward force F acting on dowel connecting pin 21. Fuse pin support bar 18 cannot move up with fuse link 10 because it is held fixed against the upper end of slot 31 in lower coupling piece 30. As fuse link 10 rises, upper guides 22 and 22a will become unseated from slots 32 and 32a. When fuse link 10 has been pulled out of lower coupling piece 30 by a sufficient amount, as in FIGURE 3, the clamping action of slots 32 and 32a on upper guides 22 and 22a will no longer be effective. Through either the force of dowel connecting pin 51 acting on the sides of hole 15 or with the provision of a preset outward springing action of tines 23 and 23a, or other means to spread apart the tines, said tines will open along bifurcation slot 15 releasing dowel connecting pin 51 and permit the separation of upper coupling piece 50 and lower coupling piece 30 containing fuse link 10. As previously noted, the clearance between tines 23 and 23a and the inside surfaces of lower coupling piece 30 is arranged to be at least equal to or greater than that of dowel connecting pin 51, thus permitting tines 23 and 23a to spread apart enough to release dowel connecting pin 51.

It will be noted that lower guide 11 is used to prevent yawing of fuse link 10 which would cause upper guides 22 and 22a to bind against the sides of slots 32 and 32a substantially impairing their operation.

It should also be noted that although this invention is operative without upper insulator pellet 20 or lower insulator pellet 17, the failure to use them would tend to increase the time it would take to trip the fuse. The conductive transfer of heat away from fuse pin 21 would tend to reduce its rate of temperature rise and thus increase the time it would take to reach the yield point of the pin. Upper insulator pellet 20 and lower insulator pellet 17 should therefore be constructed of material having a low rate of thermal conductivity but also a high compressive strength such as $Al_2O_3$, MgO or the like.

Although the foregoing description encompasses only one embodiment of this invention, it can be seen by one skilled in the art, that this invention may take many different shapes and forms and is to be limited only as defined by the scope of the appended claims.

What is claimed is:

1. In a fuse device for use in a nuclear reactor, the combination comprising a fuse connector assembly having first and second coupling members slideably arranged with respect to each other, and a fuse pin member disposed to support compressive force exerted between said coupling members and to restrain sliding motion therebetween, said fuse pin being formed of material having a plastic flow deformation characteristic limit achievable on application of excessive temperature thereto to be lower than the compressive force thereon.

2. In a fuse device for use in a nuclear reactor, the combination comprising a fuse connector assembly having first and second coupling members slideably arranged with respect to each other, and a fuse pin member disposed to support compressive force exerted between said coupling members and to restrain sliding motion therebetween, said fuse pin being formed of a fissile material having a heating characteristic in neutron flux at an excessive reactivity level of said reactor effective to achieve a temperature above the lower plastic flow deformation limit thereof.

3. In a fuse device for use in a nuclear reactor, the combination comprising a fuse connector assembly having an upper coupling piece, a lower coupling piece, a fuse body slideably arranged with respect to said lower coupling piece, and a fuse pin member disposed in said fuse body to support compressive force exerted between said upper coupling piece and said lower coupling piece and to restrain sliding motion between said fuse body and said lower coupling piece, said fuse pin being formed of a fissile material having a heating characteristic in neutron flux at an excessive reactivity level of said reactor effective to achieve a temperature above the lower plastic flow deformation limit thereof.

4. In a fuse device for use in a nuclear reactor, the combination comprising a fuse connector assembly having an upper coupling piece, a lower coupling piece, a hollow fuse body slideably arranged with respect to said lower coupling piece and provided with a slot proximate the upper end thereof bifurcately dividing said fuse body, and a fuse pin member disposed in said fuse body to support compressive force exerted between said upper coupling piece and said lower coupling piece and to restrain sliding motion between said fuse body and said lower coupling piece, said fuse pin being formed of a fissile material having a heating characteristic in neutron flux at an excessive reactivity level of said reactor effective to achieve a temperature above the lower plastic deformation limit thereof.

5. For use in a nuclear reactor, a fuse device comprising, in combination, an upper coupling piece, a lower coupling piece provided with a terminal recess, a hollow fuse body slideably disposed in said recess and provided with a slot bifurcately dividing said fuse body, means defining a fuse pin positioned in the hollow of said fuse body with the lower end of said fuse pin bearing against the lower end of the hollow in said fuse body, a fuse pin support bar transmitting a downward force to the top of said fuse pin from said lower coupling piece, means for clamping the upper end of said bifurcately divided fuse body to said upper coupling piece, said means being releasable upon movement of said fuse body out of said lower coupling piece.

6. For use in a nuclear reactor, a fuse device comprising, in combination, an upper coupling piece, a lower coupling piece provided with a terminal recess, a hollow fuse body slideably disposed in said recess and provided with a slot bifurcately dividing said fuse body, means defining a fuse pin positioned in the hollow of said fuse body with the lower end of said fuse pin bearing against the lower end of the hollow in said fuse body, a fuse pin support bar arranged to restrain sliding motion between said fuse body and said lower coupling piece and to transmit downward force to the top of said fuse pin from said lower coupling piece, a connecting pin coupling said upper coupling piece to said lower coupling piece, means included in said bifurcately divided fuse body for clamping the upper end of said bifurcately divided fuse body to said connecting pin, said means being releasable upon compressive deformation of said fuse pin and movement of said fuse body out of said lower coupling piece.

7. The combination according to claim 6 wherein said fuse pin is formed of a fissile material having a heating characteristics in a neutron flux at an excessive reactivity level of said reactor effective to achieve a temperature above the lower plastic flow deformation limit thereof.

References Cited by the Examiner

UNITED STATES PATENTS

| 2,987,455 | 6/61 | Huston et al. | 176—22 |
| 3,115,453 | 12/63 | Paget et al. | 176—22 |

FOREIGN PATENTS

| 235,874 | 3/60 | Australia | 176—22 |

CARL D. QUARFORTH, *Primary Examiner.*

REUBEN EPSTEIN, *Examiner.*